United States Patent [19]

Kaburagi et al.

[11] 4,151,874
[45] May 1, 1979

[54] HEAT EXCHANGER FOR FLUE GAS

[75] Inventors: Katsuhiko Kaburagi; Hideyuki Naruwa, both of Wakayama; Izumi Mizobuchi; Seiji Yoshida, both of Osaka, all of Japan

[73] Assignees: Sumitomo Metal Industries Limited; Hirakawa Iron Works Ltd., both of Japan

[21] Appl. No.: 799,606

[22] Filed: May 23, 1977

[51] Int. Cl.² ............................................. F28F 27/00
[52] U.S. Cl. ......................................... 165/32; 165/86; 165/96; 165/134 R; 165/142; 165/176; 165/DIG. 2
[58] Field of Search .................... 165/DIG. 2, 86, 96, 165/142, 137, 32, 176, 134, 134 DP; 237/55

[56] References Cited
U.S. PATENT DOCUMENTS

| | | | |
|---|---|---|---|
| 1,649,610 | 11/1927 | McGuane | 165/96 |
| 2,147,283 | 2/1939 | Covell | 165/96 |
| 2,295,115 | 9/1942 | Keller | 165/86 |
| 3,319,709 | 5/1967 | Strunk | 165/86 |
| 3,446,277 | 5/1969 | White | 165/142 |
| 3,586,098 | 6/1971 | Wellensiek | 165/142 |
| 3,646,992 | 3/1972 | Ishizawa et al. | 165/96 |
| 3,732,916 | 5/1973 | Cope | 165/96 |

FOREIGN PATENT DOCUMENTS 593001 10/1947 United Kingdom ............ 165/86

Primary Examiner—Sheldon J. Richter
Attorney, Agent, or Firm—Watson, Cole, Grindle & Watson

[57] ABSTRACT

A heat exchanger for flue gas in which water tubes are inserted through the flue wall into the flue from the exterior thereof so as to be adjustable in the depth of insertion. Each of the water tubes has a structure comprising an inner water feed tube and an outer recovering tube for recovery of the waste heat by returning the water from the water feed tube to generate steam by heat transferring from the waste gas passing through the flue. Headers are provided at each exterior top of the feed water tubes and recovering tubes and are connected respectively to a water-steam drum through movable connecting tubes. The headers are movable in co-operation with driving means provided at the exterior of the flue so as to adjust the heating surface of the water tubes inserted into the flue by the action of the driving means.

7 Claims, 8 Drawing Figures

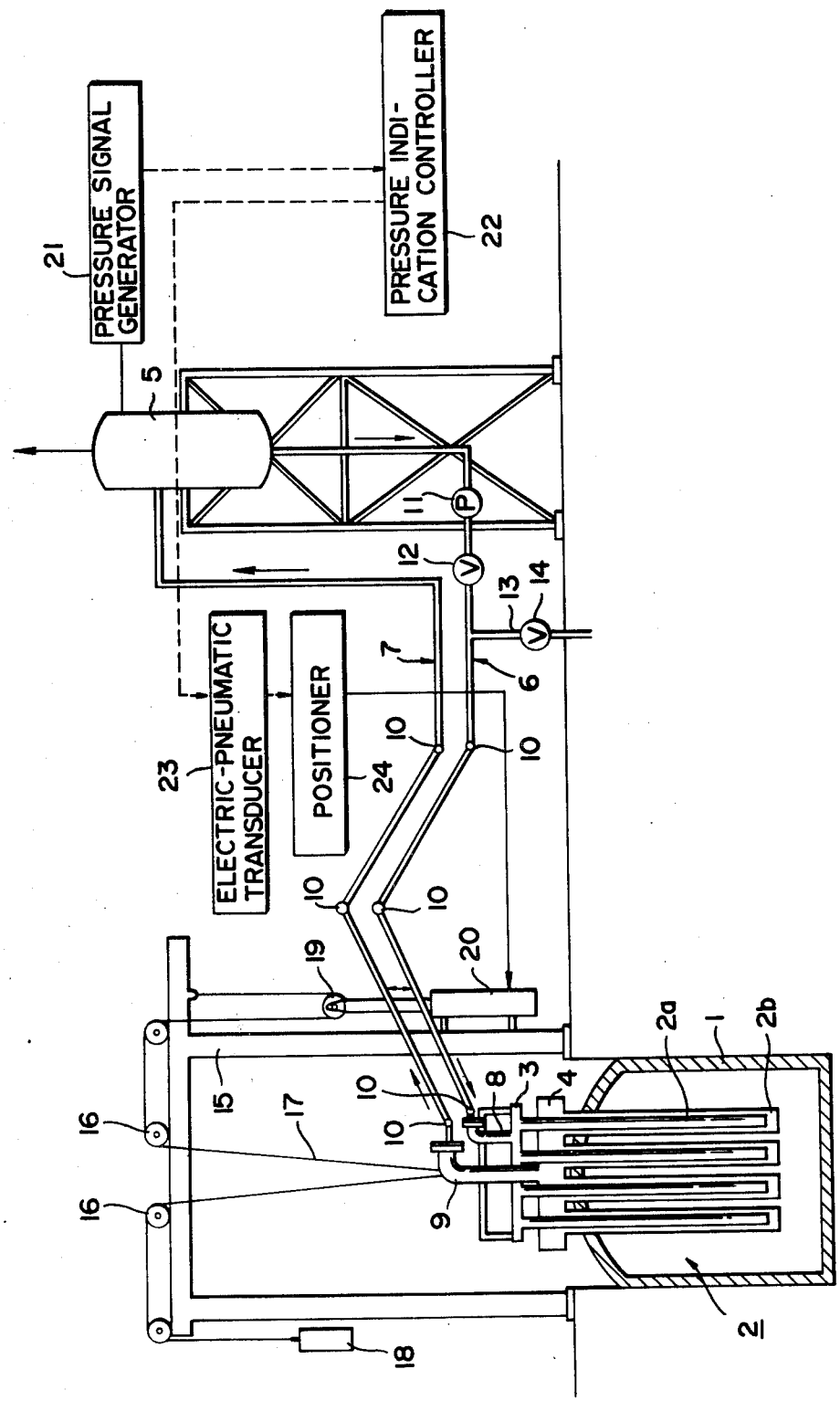

HEAT EXCHANGER FOR FLUE GAS

BACKGROUND OF THE INVENTION

1. Field of the Invention

The present invention relates to a heat exchanger for flue gas for effectively recovering high temperature heat of the flue gas so as to generate steam to be supplied, for example, to other places or other portions of an apparatus requiring steam.

2. Description of the Prior Art

Various processes or equipment have been proposed for recovering the waste heat of the aforementioned waste gas or the like to utilize the heat for other purposes. However, in the actual operation of a furnace, boiler or the like of various types from which waste gas is exhausted, changes in the load and amount of waste gas frequently occur. In order to effectively recover the waste heat within a certain range from the waste gas while still maintaining the waste gas at an acceptable temperature for drafting it into the stack, such changes in load and amount cannot be overcome by a fixed heat recovery unit.

In other words, it is necessary to recover waste heat in amounts corresponding to such changes in the conditions of the waste gas exhausted from its source. Therefore, the recovery unit for the waste heat should be provided with a variable adjusting mechanism. Most conventional processes and equipment lack such an adjusting mechanism and an object of the present invention is therefore to improve these conventional processes and equipment.

SUMMARY OF THE INVENTION

The present invention has been realized by taking notice of such shortcomings encountered in the conventional waste heat recovery and consequently making the heat exchanger itself adjustable or movable so as to accommodate any change in the temperature and flow rate of the waste gas to thereby effectively recover the waste heat of the gas without decreasing the waste gas temperature below the level required for the draft in the stack.

Accordingly, it is a primary object of the present invention to provide a heat exchanger for flue gas which can effectively recover the waste heat of the gas by adjusting the depth of insertion of water tubes inserted into the flue for exhausting the waste gas, thereby adjusting the heating surface of the tubes the recovery of the waste heat in accordance with the changes in the waste gas.

It is another object of the present invention to provide a heat exchanger which is of simplified structure, which has an occupied area which is reduced by inserting the main heating portion into the flue, and in which the operation, maintenance and inspection can be carried out immediately and conveniently from the exterior thereof.

It is a further object of the present invention to provide a heat exchanger for flue gas in which the steam produced in the recovery unit is used, for example, for preventing or controlling the production of nitrogen oxides ($NO_x$) from sources of the waste gases so as to simultaneously achieve the prevention of public nuisance and heat economy.

BRIEF DESCRIPTION OF THE DRAWINGS

FIG. 1A shows a partly broken schematic front view of an embodiment of the present invention.

DETAILED DESCRIPTION OF THE PREFERRED EMBODIMENTS

FIG. 1 is a sectional view showing the structure of a heat exchanger in accordance with the present invention. In the middle portion of flue 1 located at the outlet of a furnace, boiler or the like, a set of water tubes 2 is inserted into the flue in a direction perpendicular to the flow direction of waste gas in the flue and from the exterior through the top wall of the flue, the depth of the insertion into the flue being represented by letter (L).

Figure 1B:
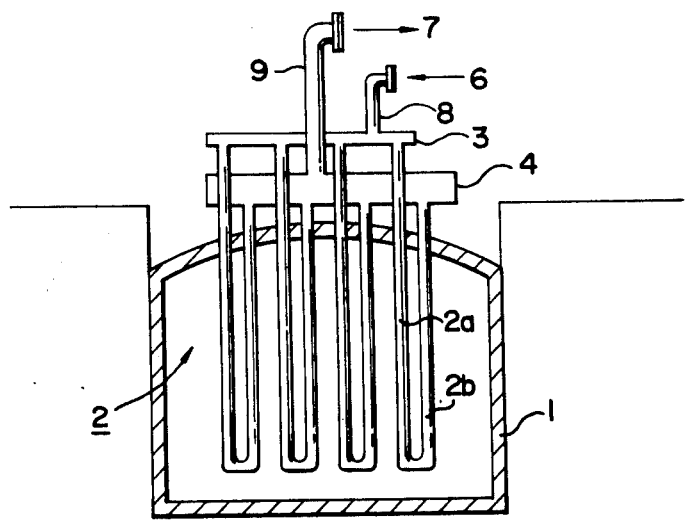
FIG. 1B shows an enlarged front view of another embodiment of water tubes.

In the embodiment as shown in FIG. 1A, water tubes 2 each comprise a circulating double tube in which water is fed into the inner feed water tube 2a and returned through the annular space between the outer heat recovering tube 2b enclosing the inner feed water tube. The water produces steam by contacting the heating surface of the recovering tube 2b i.e., by heat exchange with the waste heat in the flue 1, the steam produced being recovered by steam-water drum 5. In another embodiment as shown in FIG. 1B, each water feed tube 2a is connected with each recovering tube 2b to form a U-tube. A plurality of water tubes 2 are provided in parallel and each top of feed water tubes 2a and recovering tubes 2b which are combined into water tubes 2 and positioned at the exterior of flue 1 are connected to horizontal headers 3 and 4, respectively.

Each header 3 or 4 is hydraulically connected, for example, to water-steam drum 5 installed at a higher level by means of a plurality of connecting tubes 6 and 7. In addition, in order that connecting tubes 6 and 7 can be movable between main feed water tube 8 and main recovering tube 9 directly attached to header 3 and 4 and water-steam drum 5, each connecting tube 6 or 7 may, for example, be connected to each header or the drum by means of universal joints 10 or by means of flexible tubes so that headers 3 and 4 connected hydraulically to water-steam drum 5 can be freely movable in a vertical direction.

In addition, forced circulating pump 11, check valve 12, branched discharging tube 13 and discharge valve 14 are provided at the midpoint of connecting tube 6 forming the feed water system. Thus the feed water from the bottom of water-steam drum 5 flows down into each feed water tube 2a of water tubes 2 in parallel from main feed water tube 8 by means of each connecting tube 6 and then flows out into each recovering tube 2b to be returned to water-steam drum 5.

The outer surface of recovering tubes 2b is exposed to the waste heat of the waste gas and the heat transferred therethrough generates steam in the recovering tubes. The steam is passed through the recovering tube system of upper header 4, main recovering tube 9 and connecting tubes 7 to the top of water-steam drum 5. A portion of the accumulated steam in drum 5 may be supplied to other units requiring steam, the remainder being liquified in the water-steam drum to be recycled to water tubes 2 through lower connecting tubes 6.

Headers 3 and 4 are connected to the ends of two ropes or chains 17 guided by rollers 16 fixed rotably on gate support 15 so as to be supported by the ropes or chains. An end of one of ropes or chains 17 is attached with a weight 18 and another end or another rope of chain 17 is fixed to the lower edge of gate support 15 via roller 19.

Roller 19 moves vertically by means of a driving means 20 such as a hydraulic cylinder, pneumatic cylinder or an electric chain block attached to the side of gate support 15 so that the vertical displacement of the roller vertically drives headers 3 and 4 supported by ropes or chains 17, thereby adjusting the depth of the insertion (L) of water tubes 2 into flue 1 and adjusting the heating surface of water tubes 2 exposed in the waste gas.

In an embodiment of the present invention, the vertical displacement of the water tubes may be effected automatically as follows:

Pressure signal generator 21 is connected to water-steam drum 5 to detect the pressure in the drum. The pressure detected is converted into an electric signal fed to pressure indication controller 22.

When the input electric signal to pressure indication controller 22 is different from the preset value of the controller, a signal is fed to electric-pneumatic transducer 23. In transducer 23, the electric signal is converted to a pneumatic signal which is fed through positioner 24 to driving means 20 to drive water tubes 2 vertically.

Similarly, it is possible to operate the vertical displacement of tubes 2 with an exhaust gas thermic signal instead of the pressure signal.

Decreased pressure in water-steam drum 5 signifies that the temperature in flue 1 is less or the insertion depth (L) of water tubes 2 is less. Therefore, the depth (L) of water tube 2 is increased by actuating driving means 20 so as to increase the heating surface. On the other hand, when the pressure in water-steam drum 5 is increased, driving means 20 is actuated so as to reduce the insertion depth (L).

In practice, if the temperature in flue 1 is decreased to a value from 200° to 300° C. due to a decrease in the waste gas amount or temperature, the flue temperature will be decreased by the heat absorption through the present heat exchanger to the dew point of acids of lower than 120° C. which can cause low temperature corrosion not only on the flue and stack but also on the water tubes themselves. Hence water tubes 2 are moved up, i.e., insertion depth (L) is reduced to decrease the heat exchanger surface of water tubes 2 in the flue, thereby maintaining the temperature at the outlet of water tubes 2 to a value higher than 150° C.

In another practice, if a boiler is operated at a working pressure of $7kg/cm^2 G$, the generated steam temperature is 169° C. When the waste gas temperature of the boiler is reduced to that temperature, the direction of heat exchanging surface is inverted so that the heat exchanging surface of water tubes 2 is adjusted to avoid such invertion.

Figure 3:
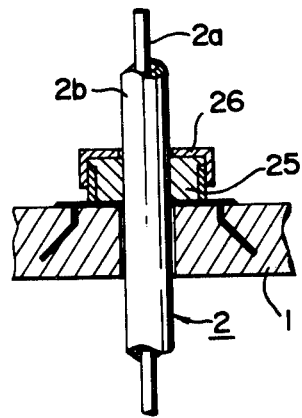
FIG. 3 is an enlarged lateral sectional view of the portions of the water tubes inserted into the flue wall.

As shown in FIG. 3, water tubes 2 may be inserted through the wall of flue 1 by providing, for example, each with metal stuffing box 26 filled with suitable heat resistive soft material 25 which provides an air tight sealing and allows displacement of water tubes 2 with respect to flue 1. Similar procedures may be employed for these purposes.

A further embodiment of the present invention will now be described with reference to FIGS. 4 and 5 in which like parts are represented by like reference numbers.

Differing from the preceding embodiment, a super heated steam generator having a structure similar to water tubes 2 in the preceding embodiment is installed separately so that water tubes 2 each comprising feed water tube 2a and recovering tube 2b and headers 3 and 4, are movable horizontally. In this embodiment, water tubes 2 are arranged in a vertically spaced relationship through the side wall of flue 1 so as to be movable horizontally. In order to adjust the horizontal insertion depth (L) of water tubes 2 in this embodiment, a plurality of supports 27 are installed perpendicular to the side wall of flue 1, rail 28 being provided on each support. Pulley 29 is mounted on each rail 28. Water tubes 2 are movable horizontally by means of driving means 20 similar to that of the preceding embodiment.

Figure 4:
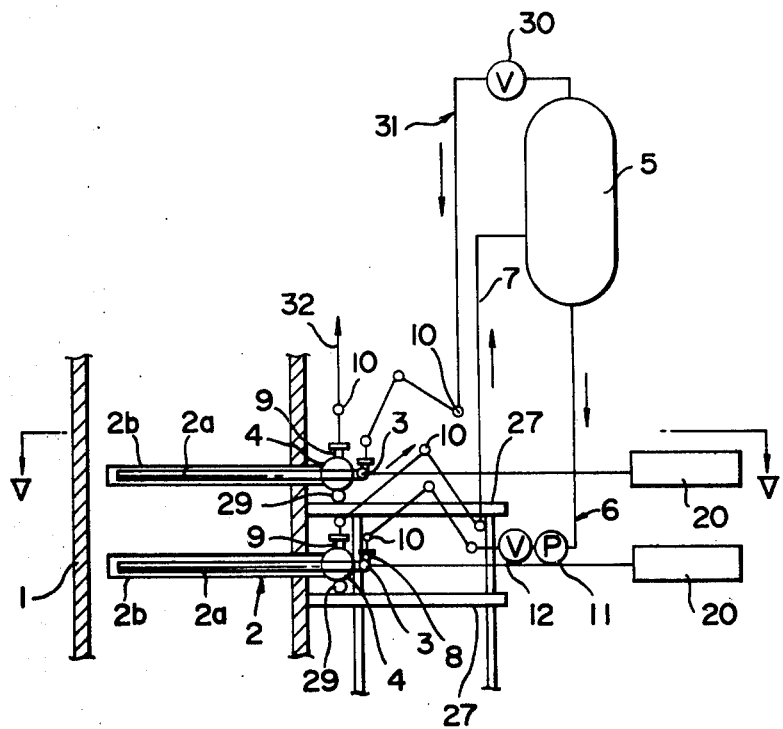
FIG. 4 is a view of main portions of another embodiment similar to FIG. 1A.
Figure 5:
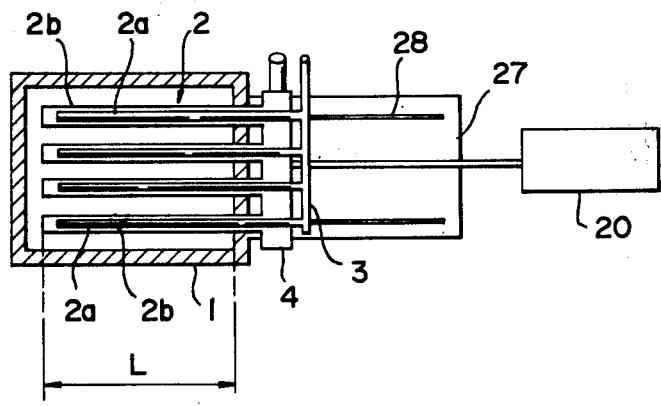
FIG. 5 is a sectional view taken along line V—V in FIG. 4.

In the embodiment as shown in FIGS. 4 and 5, two sets of water tubes 2 are illustrated. One set of water tubes 2 is connected to water-steam drum 5 similarly to that of the preceding embodiment and saturated steam from the water-steam drum is fed to another set of water tubes 5 through valve 30 and feeding tube 31 and the superheated steam generated in the latter set of water tubes is recovered through recovering tube 32.

Figure 2:
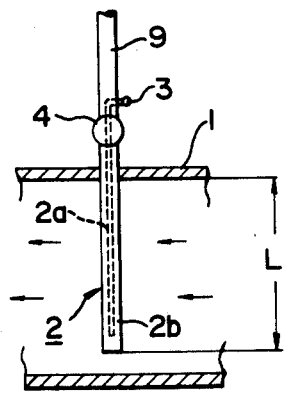
FIG. 2 is a sectional side view of the main parts in flue in the embodiment as shown in FIG. 1A.
Figure 7:
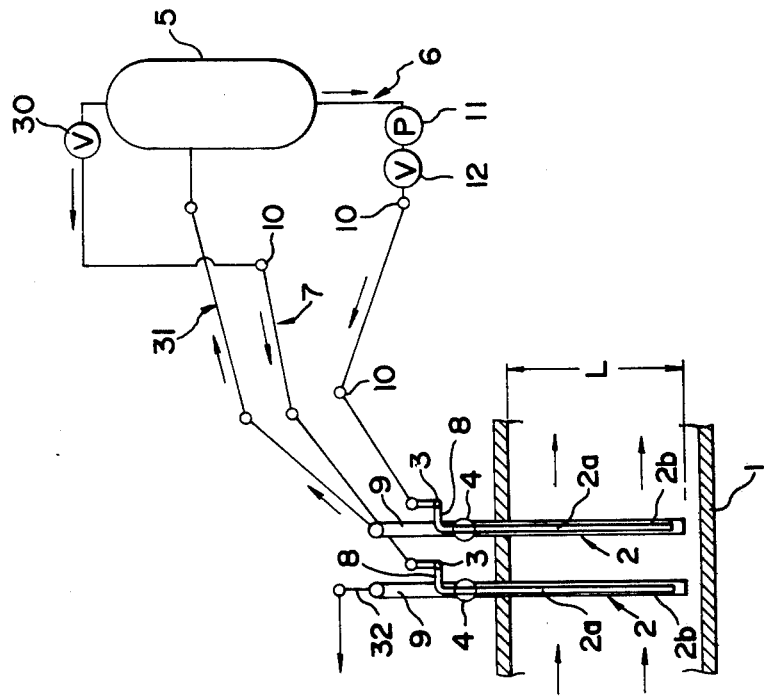
FIG. 7 is a sectional view taken along line VII—VII in FIG. 6.
Figure 6:
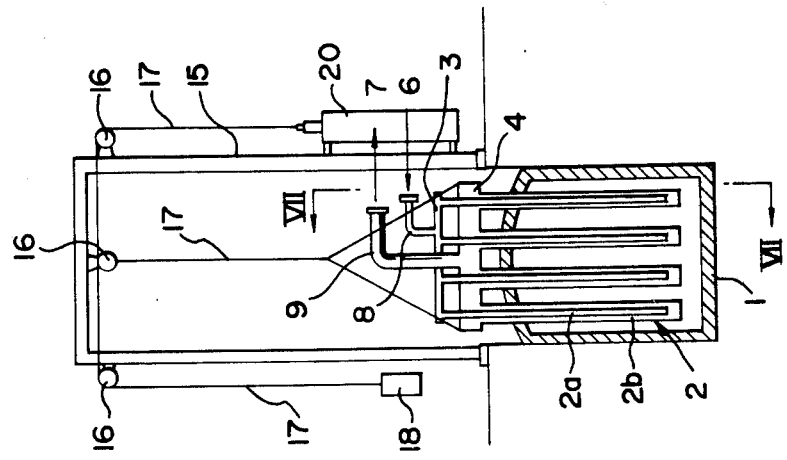
FIG. 6 is a view of still other embodiment of the present invention similar to FIG. 1A.

A still further embodiment as shown in FIGS. 6 and 7 has the same structure as that shown in FIGS. 1 and 2 except that an additional set of water tubes 2 is provided and each of the two sets of water tubes 2 is connected to water-steam drum 5 similarly to the connection as shown in FIGS. 4 and 5.

As mentioned in describing these embodiments, the heat exchanger for flue gas according to the present invention is intended to recover the waste heat of a waste gas passing through a flue to the maximum extent within the range providing sufficient draft from the stack by means of heat exchange to form steam usable in other units. Hence in the present invention, the water tubes arranged in flue for the heat exchange are movable so as to adjust the heating surface even during the operation of the waste gas source, i.e., of furnaces or boilers. Therefore the heat exchanger can be operated without any adverse effects on the operation of waste gas sources.

According to the present invention, the adjustment of the heating surface of the water tubes inserted into the flue and exposed to the waste gas can be effected automatically depending on the temperature and amount of the waste gas from the exterior of the flue so that effective heat recovery can be carried out without any adverse effects on the draft from the stack. In addition, since the main portion of the heat exchanger to recover waste heat in the waste gas is to be inserted into the flue, the space required for the installation can be markedly reduced. Furthermore, since the heat exchanger itself is very simple and requires no large-scale complex units, it is very economical and sufficient simplification and labor-saving can be attained. Still further, the heat exchanger can be operated conveniently from the exterior of the flue and therefore its maintenance, inspection and adjustment can be performed very easily.

Consequently, the unit of the present invention affords great benefits for use in iron works, steelmaking, petroleum refining and other industries requiring high temperature processes.

What we claim is:

1. A heat exchanger for a flue comprising at least one set of water tubes inserted into the flue from the exterior thereof and arranged in a direction perpendicular to the flow direction of a high temperature waste gas passing through the flue; driving means connected to said water tubes so that said water tubes can be movable longitudinally to adjust the insertion depth of said water tubes in the flue by driving said driving means, thereby adjusting the heating surface of said water tubes, a pressure signal generator and a pressure indication controller for comparing the difference between a signal supplied from said pressure signal generator and a predetermined pressure, said driving means adjusting the heating surface of the water tubes in response to the signal generated by said controller.

2. The heat exchanger according to claim 1 wherein said water tubes are movable vertically in co-operation with said driving means provided over the flue.

3. The heat exchanger according to claim 1 wherein said water tubes are movable horizontally on a rail provided at the side of the flue.

4. The heat exchanger according to claim 1 wherein saturated steam generated by one set of water tubes is introduced into another set of water tubes to produce superheated steam.

5. The heat exchanger according to claim 1 wherein each of said water tubes has a cylindrical double tube structure comprising an inner feed water tube and an outer recovering tube for recovering the waste heat in the flue by the heat transferring to generate steam while returning the feed water through the outer recovering tube.

6. The heat exchanger according to claim 1 wherein each of said water tubes comprises a feed water tube and a recovering tube connected in U-form to the same direction.

7. The heat exchanger according to claim 1 wherein each set of a feed water tube and recovering tube are provided with a header at the top of the respective tubes and said headers are connected to a water-steam drum through movable connecting tubes.

* * * * *